United States Patent
Sridharan et al.

(10) Patent No.: US 6,831,911 B1
(45) Date of Patent: Dec. 14, 2004

(54) SYSTEM AND METHOD FOR RECEIVING AND PROCESSING GPS AND WIRELESS SIGNALS

(75) Inventors: Guruswami M. Sridharan, Jacksonville, FL (US); Kartik M. Sridharan, Jacksonville, FL (US)

(73) Assignee: Ashvattha Semiconductor Inc., San Diego, CA (US)

( * ) Notice: Subject to any disclaimer, the term of this patent is extended or adjusted under 35 U.S.C. 154(b) by 436 days.

(21) Appl. No.: 09/715,502

(22) Filed: Nov. 18, 2000

(51) Int. Cl.[7] ............................................... H04S 3/00
(52) U.S. Cl. ..................... 370/345; 370/337; 370/339
(58) Field of Search ................................. 370/314, 321, 370/337, 339, 341, 345, 347, 348, 376; 342/357.1

(56) References Cited

U.S. PATENT DOCUMENTS

| | | | | |
|---|---|---|---|---|
| 5,119,504 A | * | 6/1992 | Durboraw, III | 455/556.2 |
| 5,712,899 A | * | 1/1998 | Pace, II | 455/456.2 |
| 5,913,170 A | * | 6/1999 | Wortham | 455/457 |
| 5,990,827 A | * | 11/1999 | Fan et al. | 342/357.11 |
| 6,211,820 B1 | * | 4/2001 | Zou et al. | 342/357.1 |
| 6,442,375 B1 | * | 8/2002 | Parmentier | 455/78 |
| 6,529,493 B1 | * | 3/2003 | Varin | 370/337 |

* cited by examiner

Primary Examiner—Wellington Chin
Assistant Examiner—William Schwaltz
(74) Attorney, Agent, or Firm—Goodwin Procter LLP

(57) ABSTRACT

A system and method for processing signals from at least two sources, using a receiver having a timer and a local code sequence, the method comprising, providing at least one signal channel divided into a plurality of sequential time slots processing said signal from a first of said two sources in a first time slot of the plurality of time slots to provide a first time slot signal, processing said signal from a second of said two sources in a second time slot of the plurality of time slots to provide a second time slot signal, processing said signal from said first of said two sources in a third time slot of the plurality of time slots to provide a third time slot signal, said first, second and third time slots occurring in sequential order, comparing said local code sequence to said signals in said first and third time slots by incrementing the local code sequence during the interval between said first and third time slots.

11 Claims, 4 Drawing Sheets

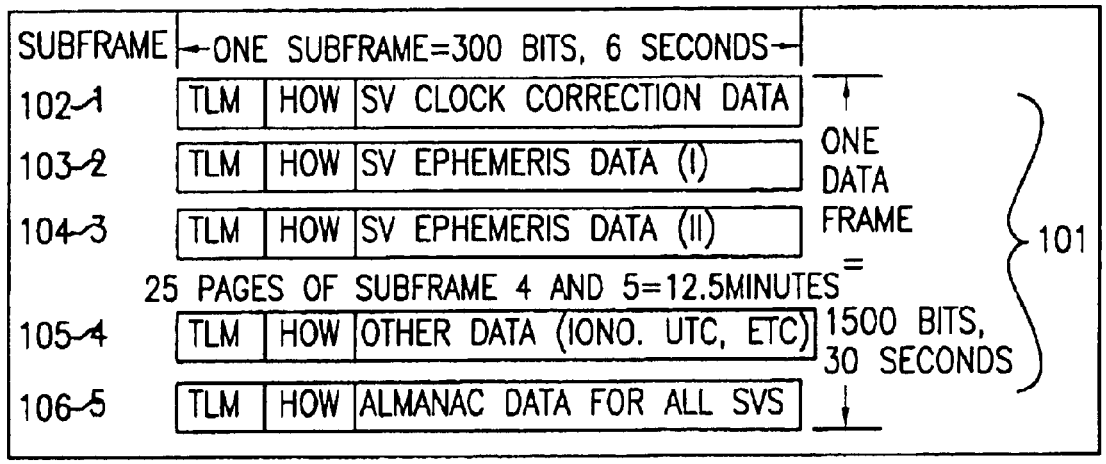
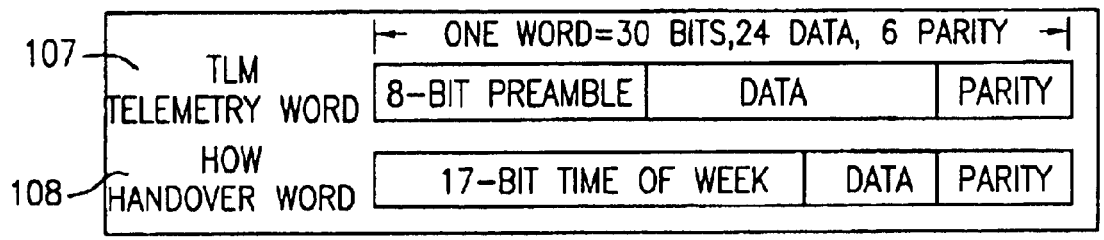
*FIG. 1*

SYSTEM AND METHOD FOR RECEIVING AND PROCESSING GPS AND WIRELESS SIGNALS

BACKGROUND OF THE INVENTION

1. Field of the Invention

The present invention relates generally to a system and method for receiving and processing Global Positioning System (GPS) and wireless phone signals using a combination receiver, more particularly, receiving and processing GPS signals and wireless signals during alternate time segments by suspending reception of GPS signals during times when wireless signal is received. During the time period when a wireless signal is received, a local clock keeps track of the time interval in order to maintain correlation between the stored and received PRN code.

2. Prior Art

The GPS is a satellite-based system that can be used to locate positions anywhere on the earth. GPS provides continuous (24 hours/day), real-time, 3-dimensional positioning, navigation and timing worldwide. Any person with a GPS receiver can access the system, and it can be used for any application that requires location coordinates.

The nominal GPS Operational Constellation consists of 24 satellites that orbit the earth in 12 hours. The GPS User Segment, which consists of the GPS receivers and the user community, can receive and convert satellite signals into position, velocity, and time estimates. Four satellites are required to solve the four unknowns of X, Y, Z (position) and Time.

The system works on the concept of trilateration. Trilateration is a principle that allows one to find a particular point, when the distance to other locations is known. In two dimensions one must know the distance to other points which distance is the radius of a circle, which circles overlap at the unknown point. In three dimensions the principle also works, however a point is located by determining its location on the surface of a sphere rather than a circle as in the two dimensional example.

In order to locate a point on the surface of intersecting spheres, the GPS system must be able to determine the distance from a series of satellites, i.e. the radius of each sphere. A GPS receiver calculates its distance from each satellite using a technique called satellite ranging by measuring the distance between the GPS receiver and satellite. The range calculated by the receiver is actually estimated and known as a pseudorange and is measured by the elapsed transit time for a signal from the satellite to the receiver.

Measuring the distance between the satellite and receiver requires finding the time interval it takes for the satellite signal to travel to the receiver and multiplying the signal travel time by the speed of light to compute the distance. The travel time interval of the satellite signal is determined by finding the time that the signal left the satellite and the time that the signal reaches the receiver. Determining when the signal reaches the receiver is easily accomplished by referring to an internal clock in the receiver, however to accurately calculate the travel time interval, it is necessary for the receiver to also know when the signal left the satellite. The GPS receiver's internal clock must be synchronized with the satellite's clock to calculate the correct interval. Synchronizing each GPS receiver with the satellites so that they generate the same digital code at the same time does this. The code sequence is known as a pseudorandom noise (PRN). When a GPS receiver receives a code from a satellite, it compares the received code to its own emitted code. The offset of the two codes reveals the travel time interval, from which the distance can be calculated. However the times involved are quite short and therefore great accuracy is necessary. An error of only one thousandth of a second, at the speed of light, will result in a distance error of almost 200 miles. In order to eliminate the need for this near perfect timing, a GPS receiver, performs a measurement to four satellites. Any error introduced by an error in timing can then be overcome by calculating a single correction factor that it can be applied to all timing measurements to cause the four spheres to intersect at a single point. Typically, the signal from 4 satellites is required for a position fix to determine 3 coordinates (e.g. latitude, longitude and height, or X, Y and Z) and a fourth to determine the clock offset.

In order to determine the location of a user, a GPS receiver needs to determine the pseudorange from at least 4 satellites and must receive navigation data from each satellite, which is the location of each satellite which is periodically corrected and updated. The pseudorange is determined by receiving a signal from a satellite, demodulating the signal to determine the PRN code and then measuring the time shift of the transmitted PRN code to local PRN code of the receiver. The satellite locations are determined from the navigation data transmitted by each satellite within the transmitted data frames. The navigation data is typically received from the satellites by receiving and processing a complete set of twenty-five frames of a navigation message, although it could also be downloaded into a GPS receiver using a variety of means, such as from another GPS device or through the internet.

The GPS Navigation Message consists of time-tagged data bits marking the time of transmission of each subframe at the time they are transmitted by a satellite. As shown in FIG. 1, a data bit frame consists of 1500 bits 101 divided into five 300-bit subframes 102–106. A data frame is transmitted every thirty seconds. Three six-second subframes contain orbital and clock data. Corrections of the satellite clocks are sent in subframe one 102 with precise satellite orbital data sets (ephemeris data parameters) for the transmitting satellite sent in subframes two 103 and three 104. Subframes four 105 and five 106 are used to transmit different pages of system data. An entire set of twenty-five frames (125 subframes) makes up the complete Navigation Message that is sent over a 12.5 minute period. Data frames (1500 bits) are sent every thirty seconds. Each frame consists of five subframes. Data bit subframes (300 bits transmitted over six seconds) contain parity bits that allow for data checking and limited error correction. Each subframe includes a header having a telemetry word 107 and a handover word 108.

As shown in FIG. 2, each GPS satellite transmits two microwave carrier signals. The L1 frequency 201 (1575.42 MHz) and L2 frequency 205 (1227.60 MHz). Three binary codes 202–204 shift the L1 and/or L2 carrier phase.

The GPS receiver produces replicas of the C/A and/or P (Y)-Code. Each PRN code is a noise-like, but predetermined, unique series of bits. The receiver produces the C/A code sequence for a specific satellite with some form of a C/A code generator. The receiver of the current invention can either store a complete set of precomputed C/A code chips in memory for each satellite, or a hardware shift register, implementation can also be used. In a shift register implementation the code chips are shifted in time by slewing the clock that controls the shift registers. In a memory lookup scheme the required code chips are retrieved from memory.

It is also necessary for making accurate timing calculations to know exactly where each satellite is in relation to the earth, therefore all GPS satellites occupy high orbits that are very predictable. The Department of Defense measures any variations in a satellite orbit. The satellite orbit information along with any orbit error information is sent to the satellites, which is then transmitted along with the timing signals to the receiver.

The GPS satellite signal includes GPS data bits where each data bit is modulated by a pseudorandom noise (PRN) code sequence that is distinct for each GPS satellite. The GPS data bits are twenty milliseconds long and have a time-of-transmission from the GPS satellite of a GPS-based clock time of 00 hours, 00 minutes, 00 seconds, and 000 milliseconds and each twenty milliseconds thereafter each day. The PRN code sequence is one millisecond long and includes 1023 chips. Each GPS data bit is modulated by twenty PRN code sequences. Three hundred GPS-data bits make up a subframe of six seconds length and five subframes make up a frame of thirty seconds length. The information needed by a GPS receiver for providing a GPS based time and geographical location fix is repeated in each frame.

Typically, when first turned on a GPS receiver may or may not know its own location and the approximate location of all the satellites as well as the local time. The GPS receiver will attempt to locate a satellite that it "knows" should be in view. The receiver does this by generating a local PRN code that matches one or more of the in view satellites. When the local code is correlated to the code received from an in view satellite, then the receiver is able to determine a pseudorange and subsequently a geographic location fix upon receiving sufficient navigation data from one or more satellites. The time it takes to determine the location for the first time is known as the time to first fix. The TTFF can vary depending on how much the receiver "knows" about its current location and satellites in view.

There is a continuous need for improving the performance of GPS receivers and a need for reducing the size, power consumption, and cost of the GPS receiver. In addition, the Federal Communications Commission has recently adopted rules for "Enhanced 911" that will require, starting in 2001, that cellular and wireless phone carriers must add to their networks the ability to report a 911 caller's location within about 400 feet which will require that each portable phone be able to discern and report its current location in real time. Of course a way to implement this requirement is to integrate the capabilities of the existing global positioning receiver with a portable phone.

Cellular or wireless phones operate using a number of different standards which differ from the GPS receiver standard. Some of the more widely used standards include TDMA, GSM, and CDMA.

Time division multiple access (TDMA) is digital transmission technology that allows a number of users to access a single radio-frequency (RF) channel without interference by allocating unique time slots to each user within each channel. TDMA relies upon the fact that an audio signal can be digitized and divided into a number of milliseconds-long packets. TDMA is the access technique used in the European digital standard, GSM, and the Japanese digital standard, personal digital cellular (PDC).

A GSM phone operates with a combination of Time- and Frequency-Division Multiple Access (TDMA/FDMA). The FDMA part involves the division by frequency of the (maximum) 25 MHz bandwidth into 124 carrier frequencies spaced 200 kHz apart. Each of these carrier frequencies is then divided in time, using a TDMA scheme. The fundamental unit of time in this TDMA scheme is called a burst period and it lasts $15/26$ ms (or approx. 0.577 ms). Eight burst periods are grouped into a TDMA frame ($120/26$ ms, or approx. 4.615 ms), which forms the basic unit for the definition of logical channels.

Code-Division Multiple Access, is a digital cellular technology that uses spread-spectrum techniques. Unlike GSM, which uses time-division multiplexing (TDM), CDMA does not assign a specific frequency to each user. Instead, every channel uses the full available spectrum. Individual conversations are encoded with a pseudo-random digital sequence. CDMA uses a modulation technique known as spread spectrum.

Recently, GPS receivers and cellular telephones have been packaged together for reducing their combined cost and size by sharing some components. However, in existing systems where a GPS receiver and a cellular telephone coexist in the same package they share little functionality and little or nothing has been done to take advantage of the circuitry and functions of the cellular telephone for improving the performance and reducing the cost of the GPS receiver. In addition, by combining the two receivers into one package it becomes necessary to provide shielding to eliminate or minimize radiation interference from one receiver to the other since GPS and wireless operate on different frequencies. There is a thus a need for a GPS receiver and wireless telephone combination that can be combined into one device, without the need for shielding and with shared functionality.

The traditional approach to processing GPS signals involves receiving a GPS signal continuously to receive continuous time slots of timing and position data. During these continuous time slots, GPS information must be present for processing to take place. Thus there is also a need to integrate a GPS receiver and a wireless phone using shared circuitry such that the GPS signal does not have to be continuously received by taking advantage of either redundancy in the data transmissions such as in a spread spectrum wireless phone or to make use of the open time intervals in a time division system such as TDMA or GSM wireless phone.

SUMMARY OF THE INVENTION

Therefore it is an object of the present invention to provide a system and method for combining a wireless phone receiver and GPS receiver than can receive and process non-contiguous blocks of GPS data by alternately receiving and processing wireless phone and GPS signals.

Accordingly, a method and system processing signals from at least two sources, using a receiver having a timer and a local code sequence, the method comprising, providing at least one signal channel divided into a plurality of sequential time slots processing said signal from a first of said two sources in a first time slot of the plurality of time slots to provide a first time slot signal, processing said signal from a second of said two sources in a second time slot of the plurality of time slots to provide a second time slot signal, processing said signal from said first of said two sources in a third time slot of the plurality of time slots to provide a third time slot signal, said first, second and third time slots occurring in sequential order, comparing said local code sequence to said signals in said first and third time slots by incrementing the local code sequence during the interval between said first and third time slots.

BRIEF DESCRIPTION OF THE DRAWINGS

These and other features, aspects, and advantages of the methods of the present invention will become better understood with regard to the following description, appended claims, and accompanying drawings where:

FIG. 1 is a data diagram depicting the modulation of GPS satellite signals.

DETAILED DESCRIPTION OF THE PREFERRED EMBODIMENT

Figure 2:
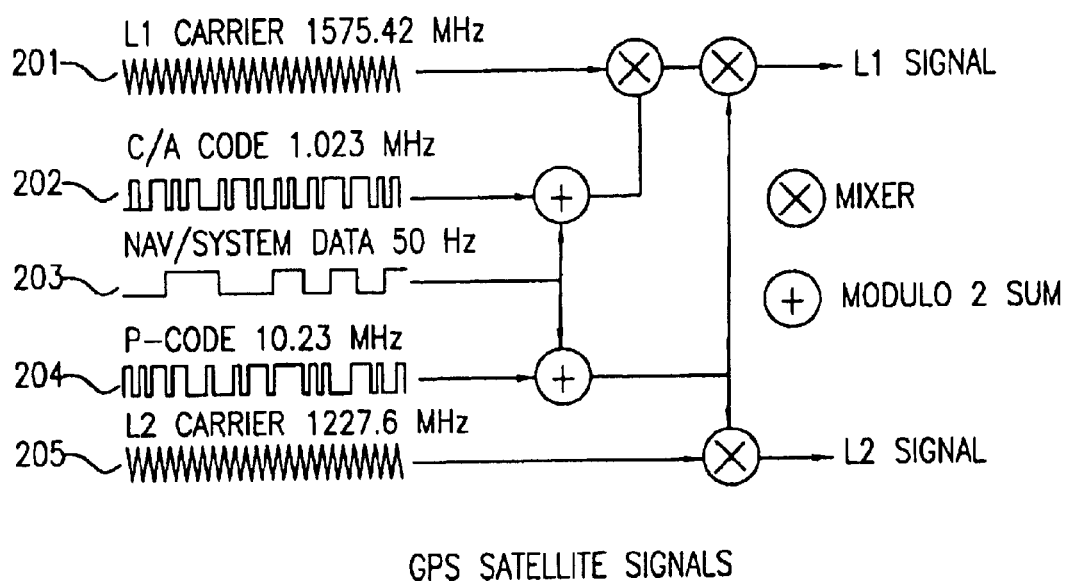
FIG. 2 is a block diagram depicting the format of GPS navigation.

Preferred embodiments of the present invention will be described in detail below while referring to the drawings attached.

In the preferred embodiment of the present invention the GPS receiver has an operational mode for acquiring a GPS signal from at least one satellite that is within range and an operational mode for receiving wireless phone signals. In a GPS operating mode, the receiver of the current invention can receive a GPS signal for discrete one millisecond time segments that can be processed to determine the pseudorange and GPS data, or optionally stored in memory for later processing. While the time segments cannot be shorter than one millisecond, the receiver of the present invention can make use of a GPS signal of variable time duration of more than one millisecond. In order to process the received signal, the receiver embodying the current invention can retrieve a local PRN code corresponding to a particular satellite from memory or generate a PRN code using a shift register. If at least one millisecond of a twenty millisecond repeated sequence of signal is received, the receiver embodying the present invention correlates the received and local PRN code to ascertain a pseudorange. By implementing the method of the present invention sufficient signal sensitivity can be achieved to determine a psuedorange even if as little as one millisecond of signal is received. If more than one 1-millisecond data chunks are available, the correlation can be extended to increase the sensitivity.

Figure 3:
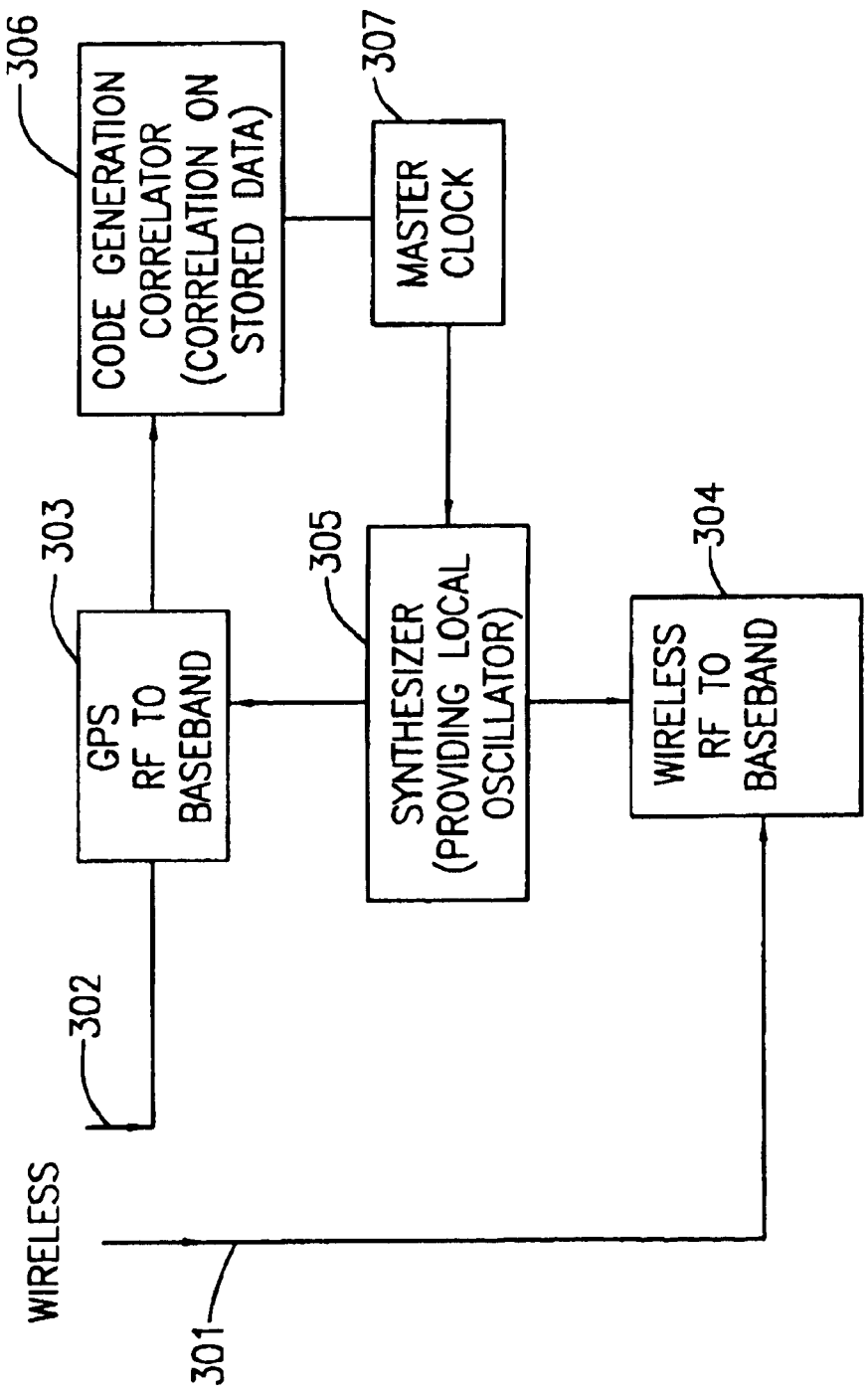
FIG. 3 is a block diagram depicting the receiver of the current invention.

The receiver of the present invention can receive the one millisecond of GPS data and store it in memory for later processing. In order to receive the GPS and wireless signals a typical RF to Baseband converter known in the art is used. There is provided one converter for GPS and a second for wireless reception. In the converter circuits one local oscillator is used which can switch between GPS and wireless frequencies very fast. (50 microseconds). FIG. 3 is a block diagram depicting the receiver of the current invention. The receiver includes a wireless antenna 301 and a GPS antenna 302, an RF to baseband converter for GPS 303, an RF to baseband converter for wireless, a synthesizer for providing a local oscillator 305, a code generation correlator 306 and a master clock 307. The GPS antenna 302 is connected to the GPS RF to baseband converter 303, which is connected to the synthesizer 305. Also connected to the GPS RF to baseband converter 303 is the code generation correlator 306 and the master clock 307 which are also connected together. The wireless antenna 301 is connected to the wireless RF to baseband converter 304, which is connected to the synthesizer 305. The master clock keeps the local time of the receiver, while the code generation correlator performs the process of comparing the received code to the locally generated code, which is described in further detail below. The receiver components of the present invention described above are connected to the other components of the GPS receiver and wireless receiver to function as a GPS and wireless receiver.

In the event that the user of the present invention desires to place or receive a wireless phone call, using a time division technology wireless phone, the receiver of the present invention will suspend reception of GPS signal to receive or transmit the wireless phone signal. Therefore by utilizing the method of the present invention, it becomes possible to combine a GPS receiver and a wireless phone using a single integrated circuit because either the GPS receiver or the wireless phone is operating, but not both at the same time. In the present invention, a TDMA wireless phone signal can be received and processed in time segments alternating with a GPS signal. The TDMA data is sent in signal bursts that last a predetermined length of time in accordance with the particular time division standard. Therefore according to the method of the present invention, the GPS receiver can be turned on to receive a GPS signal, then turned off to receive a TDMA signal. When the TDMA signal has been received, the receiver can be switched to the GPS operational mode again.

During the period when the wireless phone signal is transmitted or received a local clock keeps track of the time interval that elapsed when no GPS signal was present. The receiver of the present invention is thus able to increment the local code for a time interval such that the local code will correspond to the received code when a GPS signal is again received. In doing so the receiver of the present invention can take advantage of open time slots that are present in wireless phone transmission technologies such as GSM or TDMA. Upon completion of the transmission or reception of a time divided wireless phone signal the receiver of the present invention will again be enabled to receive a GPS signal during open time slots not used for the reception or transmission of the wireless phone signal.

In the event that the user of the present invention desires to place or receive a wireless phone call, using a spread spectrum technology wireless phone, such as CDMA the receiver of the present invention will suspend reception of GPS signal to receive or transmit the wireless phone signal. In a wireless phone that uses a spread spectrum modulation technique the transmitted signal is spread over a frequency much wider than the minimum bandwidth required for sending the signal. This technique provides for redundancy in the transmission of data. For example, in channels with narrowband noise, increasing the transmitted signal bandwidth results in an increased probability that the received information will be correct. Furthermore, spread spectrum technology devices transmit data utilizing multiple chips per bit and employ error correction techniques. In other words the spread spectrum modulation technique adds a lot of redundancy to the data transmission. Therefore it is possible using the present invention to switch from the reception and processing of a spread spectrum wireless signal to the reception of a GPS signal for a short time period such as I ms per second, without degrading the wireless signal a significant amount. During the period when the wireless phone signal is transmitted or received a local clock keeps track of the time interval that elapsed when no GPS signal was present. The receiver of the present invention is thus able to increment the local code for a time interval such that the local code will correspond to the received code when a GPS signal is again received. Upon completion of the transmission or reception of a packet of wireless phone data modulated on a wireless signal the receiver of the present invention will again be enabled to receive a GPS signal. In the event that the wireless phone signal is continuous the receiver of the present invention will stop the wireless phone signal for a predetermined discrete time interval to acquire a GPS signal. In doing so the receiver of the present invention can take advantage of data transmission redundancy built into phone transmissions technologies using spread spectrum techniques, such as CDMA.

Figure 4:
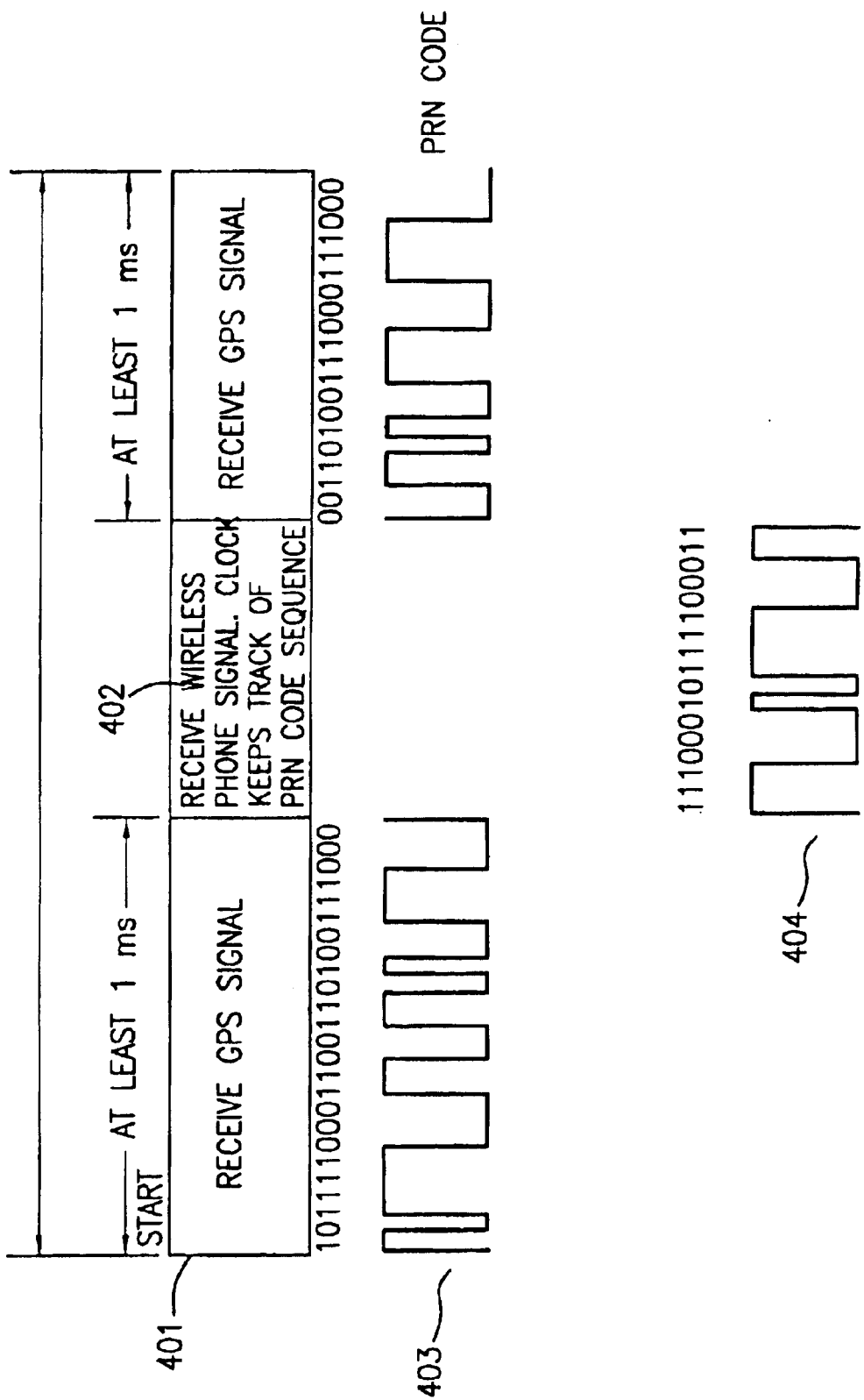
FIG. 4 is a block diagram depicting a time sequence for the reception of two data signals.

In accordance with the diagram of FIG. 4, upon entering the operational mode when a GPS signal is present the receiver will begin to receive the GPS signal 401. The first step in arriving at a geographical position fix is to determine the pseudorange. The GPS signal that is modulated by the PRN code is received in bits of 20 ms. The 20 ms bit consists of a PRN code of 1 ms duration representing a one or a zero that is repeated 20 times. Typically, in order to ascertain a psuedorange a GPS receiver continuously receives signal data in order to determine the time shift from the local C/A code and the received C/A code. The C/A code generator repeats the same 1023-chip PRN-code sequence every millisecond for twenty milliseconds.

In the present invention when the signal received is as short as 1 ms the receiver will then integrate over time to determine the time shift of the PRN code and thus determine a pseudorange. When the GPS receiver of the present invention switches to an operational mode to receive wireless phone signals 402 an internal clock keeps track of the elapsed time. When no GPS signal is received, the receiver of the present invention can either continue to increment the stored PRN code 403 sequence or to save power, stop the code sequence 404, measure the time interval when a GPS signal is not received and upon commencing reception of GPS data after a lapse, advance the PRN code for the measured time interval. In either case, the receiver is able to ascertain a psuedorange without the need for continuously receiving a GPS signal. The receiver can then utilize the psuedorange in combination with the previously gathered navigation.

The GPS receiver of the present invention implements a method known as coherent integration of more than 1 ms of either contiguous or non-contiguous signal. Coherent Integration is the process of comparing the received code to the locally generated code, to determine their correlation, on a chip by chip basis. The integration begins and ends in predetermined time. To start with, a Count Register is cleared and its contents are zeroed. If the local code and received code match, then the integrator increments the count by one; if they do not match, the integrator decrements the Count Register by one. At the end of the integration period, the value stored in the Count Register, which is a true indication of correlation, is dumped into a memory and the Count Register is again zeroed. This process is called coherent integration. This correlation value is used to determine whether the local code is in synchronization with the received code.

In our case, we define coherent integration for non-continuous chunks of data also. During the time interval when integration is not needed (for example during a wireless time slot), the Count register is neither incremented nor decremented; the local code is suitable time advanced to compensate for the hold time.

Note that as the integration time is increased, the sensitivity i.e. how low input power can be reduced and still the system works, also increases.

During the time when GPS signal is not received due to a wireless time slot, perfect correlation is assumed and the coherent integration is continued. This process of coherent integration improves the sensitivity of a GPS receiver. For example, if the receiver has two 1 ms non-contiguous chunks of GPS data separated by a wireless slot, the integration is performed coherently to double the sensitivity. This assumes 1) a 20 ms data edge is not present between the two non-contiguous chunks and 2) good clock accuracy (maximum jitter of approximately 100 picoseconds per second). In case the data edge is present, this chunk is ignored.

In one embodiment of the present invention, the GPS can receive a GPS signal and store that signal for later processing. In other words it is possible to receive the GPS signal, save the signal without processing, and then at a later time retrieve the signal from memory and demodulate the signal to obtain the psuedo-range.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A method for processing signals from at least two sources, using a receiver having a timer and a local code sequence, the method comprising;

providing at least one signal channel divided into a plurality of sequential time slots, processing a signal from a first of said at least two sources in a first time slot of the plurality of time slots to provide a first time slot signal, processing a signal from a second of said at least two sources in a second time slot of the plurality of time slots to provide a second time slot signal, processing said signal from said first of said at least two sources in a third time slot of the plurality of time slots to provide a third time slot signal, said first, second and third time slots occurring in sequential order, comparing said local code sequence to said signals in said first and third time slots by incrementing the local code sequence during the interval between said first and third time slots.

2. The method of claim 1, wherein the local code sequence is stored in memory.

3. The method of claim 1, wherein the local code sequence is generated locally.

4. The method of claim 1, wherein the signal from the first of said at least two sources is a continuous signal.

5. The method of claim 1, wherein the signal from the second of said at least two sources is a time division signal.

6. The method of claim 1, wherein the signal from the first of said at least two sources is a GPS signal.

7. The method of claim 5, wherein the signal from the second of said at least two sources is a TDMA communications signal.

8. The method of claim 3, wherein the signal from the second of said at least two sources is a GSM communications signal.

9. The method of claim 1, wherein said signal from the first of said at least two sources is processed in real time.

10. The method of claim 1, wherein said signal from the first of two sources is stored in a memory and retrieved from the memory, after a predetermined period of time.

11. A receiver for processing signals from at least two sources comprising;
- a first antenna electrically connected to a first RF-to-baseband-converter and a second antenna electrically connected to a second RF-to-baseband-converter,
- a synthesizer electrically connected to the first RF-to-baseband-converter and second RF-to-baseband-converter
- a code generation correlator, connected to the first RF-to-baseband-converter for correlating a received code and a local code, and
- a master clock for keeping local time electrically connected to the code generation correlator and the first RF-to-baseband-converter.

* * * * *